(12) United States Patent
Soldani (10) Patent No.: US 7,157,118 B2
(45) Date of Patent: Jan. 2, 2007

(54) ELASTOMERIC MATERIAL AND PROCESS FOR PREPARATION THEREOF

(75) Inventor: Giorgio Soldani, Pisa (IT)

(73) Assignee: Integrated Biomaterial & Cell Technologies S.r.l., Bologna (IT)

( * ) Notice: Subject to any disclaimer, the term of this patent is extended or adjusted under 35 U.S.C. 154(b) by 320 days.

(21) Appl. No.: 10/677,389

(22) Filed: Oct. 2, 2003

(65) Prior Publication Data

US 2004/0132926 A1 Jul. 8, 2004

(30) Foreign Application Priority Data

Apr. 10, 2002 (EP) .................................. 02425600

(51) Int. Cl.
*C08F 283/12* (2006.01)
*B05D 5/00* (2006.01)

(52) U.S. Cl. ................ 427/387; 427/388.1; 427/393.5; 525/440; 525/453; 525/460

(58) Field of Classification Search ..................... None
See application file for complete search history.

(56) References Cited

U.S. PATENT DOCUMENTS

| | | | |
|---|---|---|---|
| 3,562,352 A | 2/1971 | Nyilas | |
| 4,623,347 A * | 11/1986 | Kira | ............................ 128/898 |
| 5,059,269 A | 10/1991 | Hu et al. | |
| 5,298,276 A * | 3/1994 | Jayaraman | ................. 427/2.25 |

OTHER PUBLICATIONS

Hazziza-Laskar et al, Journal of Applied Science, 58, pp. 77-84, 1995.*

* cited by examiner

*Primary Examiner*—Erma Cameron
(74) *Attorney, Agent, or Firm*—Pearne & Gordon LLP (57) ABSTRACT

Process for preparing an elastomer material including a step in which a polyurethane is reacted with a polydialkylsiloxane in the presence of a solvent at a temperature below 100° C.

20 Claims, 7 Drawing Sheets

ELASTOMERIC MATERIAL AND PROCESS FOR PREPARATION THEREOF

BACKGROUND OF THE INVENTION

1. Field of the Invention

Most patients suffering from peripheral atherosclerotic vascular illnesses or from heart pathologies such as coronary ischemia need substitutive vascular ducts so as to retrieve vascular continuity, or valve substitutes so as to retrieve heart valve function.

2. Prior Art

As far as vascular ducts are concerned, until today no biological synthetic substitute has been able to reproduce the characteristics of vascular ducts in living beings.

Vascular substitutes made of mechanically resistant synthetic materials, such as for instance polytetrafluoroethylene (Teflon®), expanded polytetrafluoroethylene (ePTFE) and polyethyleneterephtalate (Dacron®), are at present the most frequently used thanks to their good behavior as large-diameter vascular ducts.

These materials are used for instance to replace abdominal aorta where diameters are around 10 mm. However, in order to replace smaller diameters the duct opening (artery) can be damaged and unsatisfying.

The most frequent cause for the unsuccessful use of small vascular prostheses consists in thrombotic deformations that may occur on the interface blood-prosthesis inner surface and in the development of intimal hyperplasia on anastomoses, with proliferation and migration of muscular cells and subsequent vessel occlusion.

For these reasons, in common aorta-coronary by-pass surgery concerning vessels whose diameter is of about 3 mm, autologous blood vessels are generally used, such as saphena or inner mammary artery.

However, in a high percentage of patients saphena or other veins cannot be used due to pre-existing pathologies or because they have already been used previously.

Therefore, there is the need for a new material without the drawbacks of prior art. In particular, there is the need for a new material enabling the preparation of vascular ducts and of valve substitutes that have a small diameter and are biocompatible, hemocompatible and biostable towards living tissues.

SUMMARY OF THE INVENTION

One of the aims of the present invention is to provide a new material for preparing vascular ducts or valve substitutes without contraindications once implanted into a living organism.

Another aim of the present invention is to provide a biocompatible, hemocompatible and biostable material for preparing small-diameter vascular ducts and valve substitutes.

These and other aims that will be evident from the following detailed description have been achieved by the Applicant, who has selected an elastomeric material for preparing vascular ducts or valve substitutes.

Therefore, a first object of the present invention consists in an elastomeric material comprising a selected polydialkylsiloxane and a polyurethane, whose characteristics are listed in the enclosed independent claim.

Another object of the present invention consists in a process for preparing an elastomeric material comprising a selected polydialkylsiloxane and a polyurethane, whose characteristics are listed in the enclosed independent claim.

A further object of the present invention consists in the use of said elastomeric material for preparing vascular ducts and valve substitutes.

Other preferred embodiments of the present invention are described in the enclosed dependent claim.

Further technical characteristics and the advantages of the invention-will be better evident from the following detailed description.

The elastomeric material according to the present invention has specific characteristics that make it useful in the medical field.

DESCRIPTION OF THE PREFERRED EMBODIMENT

The invention includes a process for preparing an elastomeric material comprising a step in which a polyurethane is reacted with a polydialkylsiloxane in the presence of a solvent at a temperature below 100° C., in which said reaction is carried out in oxygen free atmosphere.

The elastomeric material according to the present invention can be obtained starting from two components (reagents).

A first component is polyurethane and the second component is a silicone, polydialkylsiloxane.

Polyurethanes have elastomeric properties. Polyurethanes have physical-mechanical features such as good resistance to abrasion, easy working (extrusion), and good compatibility with tissues that are similar to silicone elastomers.

Unfortunately, the polyurethanes used until now show a biodegradation occurring once the material is implanted in contact with tissues.

On the other hand, silicones have good features of biocompatibility such as hemocompatibility (low activation of platelets and coagulation factors) and a prolonged biostability in biomedical applications.

Silicone polymers have elastomeric properties.

Silicone elastomers consist of linear polymers with a high molecular weight.

However, although silicones have an excellent resistance to high temperatures and a good flexibility at low temperatures, their mechanical resistance is far lower than polyurethanes.

The elastomeric material according to the present invention has specific properties that are an excellent compromise between the best properties of polyurethanes and the best properties of silicones.

In the elastomeric material according to the present invention the silicone content improves polyurethane hemocompatibility and the biostability properties of polyurethane, whereas the polyurethane content improves the features of tissue compatibility of the silicone elastomeric component.

The properties of the elastomeric material according to the present invention are obtained through the selection of components, through the selection of the stoichiometric ratios between said first and second component and through the particular reaction conditions used in the synthesis of the elastomeric material.

The elastomeric material has an interpenetrating polymeric network (reticulation) between silicone and polyurethane.

Said first component is a polyurethane and said second component is a silicone.

A polyurethane is obtained from a synthesis reaction between an alcohol monomer and an isocyanate monomer.

Preferably, fluorinated polyurethanes can be used.

Furthermore, co-polyurethanes can be used, particularly block or segmented co-polyurethanes. Polyurethanes can be chosen among segmented aliphatic polyurethanes or among segmented aromatic polyurethanes.

Preferably, the polymers used in the present invention should have good elastomeric properties and good biocompatibility and hemocompatibility.

Preferably, said polymers should have a good solubility and stability at relatively low boiling points and a good miscibility with water-based solvents.

Advantageously, said first component is chosen among polyether-urethanes or, alternatively, among polyester-urethanes.

For instance, the polyurethane used in the present invention can be chosen among aliphatic polyurethanes. Aliphatic polyurethane is prepared for instance starting from a diisocyanate and a polyol. Diisocyanate is chosen for instance among 1,2-diisocyanate ethane, 1,5-diisocyanate pentane, hexamethylene diisocyanate, methane diisocyanate pentane, 1,9-diisocyanate nonane, 1,8-diisocyanate octane, 1,4-diisocyanate butane, 4,4'-methylenebiscyclohexyl diisocyanate, lysine diisocyanate, 1,4-transcyclohexane diisocyanate, dimethylisocyanate silane, diethyldiisocyanate silane.

The diisocyanate mentioned above is reacted with a polyol having a molecular weight of 500 to 10,000 chosen for instance among poly(ethylene adipate), poly-(tetramethylene adipate), poly-(1,4-cyclohexyldimethylene adipate), poly-(hexamethylene oxalate), poly-(hexamethylene glutarate), poly-(caprolactone), poly-(tetramethylene oxide), poly-(ethylene oxide), poly-(1,2-propylene oxide).

Said second component is a silicone.

Preferably, said silicone is chosen among polysiloxanes.

Preferably, said polysiloxane is chosen among polidialkylsiloxanes.

Advantageously, said polydialkylsiloxane is a polydimethylsiloxane (PDMS).

Said polydimethylsiloxane has four terminal groups, two for each end, terminal chain portion.

Each of the four terminal portions can be blocked with an acetoxy group.

Preferably, said polydimethylsiloxane has one to four acetoxy groups (functionalized silicone).

Advantageously, said polydimethylsiloxane has four acetoxy groups, two for each terminal chain portion.

The elastomeric material according to the present invention is obtained from a reaction between a (aliphatic or aromatic) polyether urethane or a (aliphatic or aromatic) polyester urethane, which is reacted with a functionalized-silicone.

Said functionalized silicone belongs to a class of silicone compounds having a PDMS (polydimethylsiloxane) chain (backbone) chemically modified so as to obtain specific reactive sites on terminal chains/portions, or alternatively on specific pendants.

These reactive/functional groups are chosen among hydroxy (—OH); methoxy ($CH_3O$—); ethoxy ($CH_3CH_2O$—); epoxy ($CH_2CHO$—); acetoxy ($CH_3COO$—); carboxy (COOH); amino (—$RNH_2$—) and other groups.

The reactive groups that are present on the silicone chain can build a bond with the functional groups that are present on the backbone of the polyurethane component and can react also through themselves giving rise to a silicone polyurethane elastomeric material (IPN=interpenetrating polymeric network).

For instance, a class of PDMS tested by the Applicant is chosen among silicones with a viscosity of 300 to 400, for instance 350 cps; a molecular weight of 5,000 to 50,000 Dalton; density of 0.97; reticulation time (pure compound) of 4 to 8 hours; tensile strength greater than 100 psi (with an elongation greater than 120); elongation (pure compound) greater than 150; Shore A hardness greater than 8.

For instance, a class of aromatic or aliphatic polyether-based polyurethanes or a class of aromatic or aliphatic polyester-based polyurethanes tested by the Applicant is chosen among polyurethanes having a viscosity of 600 to 900, for instance 700–800 cps; Shore A hardness greater than 80; density for instance of 1.11; tensile strength of 4.2 Mpa (with a 50% elongation), 5.4 Mpa (with a 100% elongation) and 10.5 Mpa (with a 300% elongation), and molecular weight of 10,000 to 200,000 Dalton.

The method for preparing the elastomeric material according to the present invention consists in a chemical reaction in solution between a polyurethane and a functionalized polydimethylsiloxane (PDMS).

Said polyurethane is a polyether urethane or a polyester urethane.

Preferably, said functionalized polydimethylsiloxane (PDMS) is chosen among diacetoxy-silyl terminated polydimethylsiloxanes (it contains four acetoxy groups, two acetoxy groups for each chain end).

Said polydimethylsiloxane is in solution in presence of a solvent such as tetrahydrofurane/dioxane.

Advantageously, before starting the synthesis reaction said first component, said second component and also the solvent are purified.

The solvents used in the process according to the present invention are mixed solvents obtained from a combination of tetrahydrofurane and dioxane. The solvents are separately distilled using a rotavapor (rotating evaporator).

Advantageously, the polyurethane material is purified (for instance up to forty purification cycles, preferably thirty cycles) in a Soxhlet extractor with a 1:1 (V/V) solution of acetone and methanol. In order to carry out the synthesis reaction, the reaction conditions such as temperature, moisture level and time, which are present in the reaction ambient, are controlled.

In order to obtain an efficient interaction between the reagents (components), the reaction has to be carried out at a temperature below 100° C., preferably of 60 to 90° C. and under stirring without volume loss in the reactor due to solvent evaporation.

So as to keep volume loss in the reactor as low as possible, a reaction medium is introduced. Said reaction medium is chosen among a 1:1 (V/V) mixture of solvents such as tetrahydrofurane/dioxane.

Said reaction medium (1:1 (V/V) mixture of solvents tetrahydrofurane/dioxane) has a boiling temperature below 95° C.

A temperature below 95° C. allows to carry out a synthesis reaction at a temperature of 60 to 90° C.; advantageously of 78 to 88° C., with a minimum solvent loss during the reaction. The reaction between polyurethane and polydimethylsiloxane is carried out using a reactor, preferably a three-neck reactor provided with heating jacket, a water condenser, a magnetic stirrer and a device for ensuring a nitrogen flow in the reaction so as to prevent the reagents (said first and second component) from absorbing moisture.

Preferably, the reaction is carried out in a time of one to twelve hours, preferably four to six hours; at a temperature of 78 to 88, advantageously at a temperature of 80 to 84, for instance 82° C.

Advantageously, the amount by weight of functionalized polydimethylsiloxane in the reaction ambient can vary according to the properties to be obtained in the elastomeric material.

Preferably, the amount of polydimethylsiloxane is of 20 to 60% by weight; still more preferably of 20 to 40% by weight; advantageously of 30 to 40% by weight.

The synthesis reaction of the elastomeric material take place probably in two steps.

In practice, the reaction conditions within the reactor, for instance a three-neck reactor (temperature, stirring and nitrogen ambient to avoid moisture) are such that the functionalized polydimethylsiloxane reacts with the hydrogen atoms of the urethane portions that are present in polyurethane chain. The formation of chemical bonds creates a reticulation. In practice, two acetoxy groups that are present in polydimethylsiloxane bind as a bridge between two backbones (two urethane chains), as shown in FIG. 1.

Figure 1:
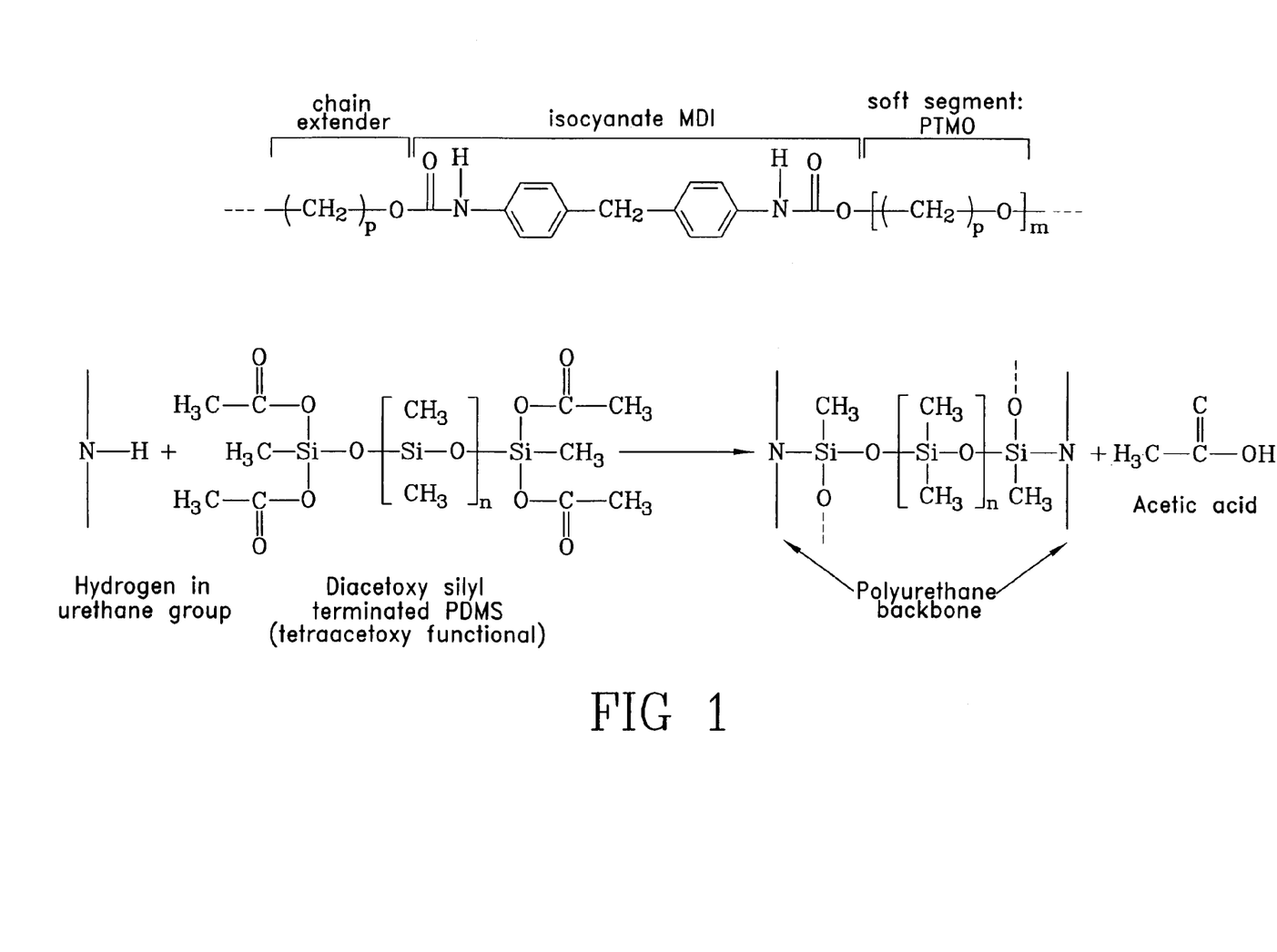
FIG. 1 shows the reticulation occurring in the polyurethane chain through the formation of the bond with the tetraacetoxy functions that are present in tetrafunctionalized polydimethylsiloxane (see page 9, lines 27–30).

FIG. 1 shows the reticulation occurring in the polyurethane chain through the formation of the bond with the tetraacetoxy functions that are present in tetrafunctionalized polydimethylsiloxane.

Then, during the polymerization of the material (by casting or spraying) the remaining amount of tetraacetoxy-functionalized polydimethylsiloxane, in presence of atmospheric humidity or water, reacts and gives rise to a condensation reaction. Such condensation reaction turns the silicone "pre-polymer" into a polymer with a higher molecular weight (elastomeric material).

Figure 2:
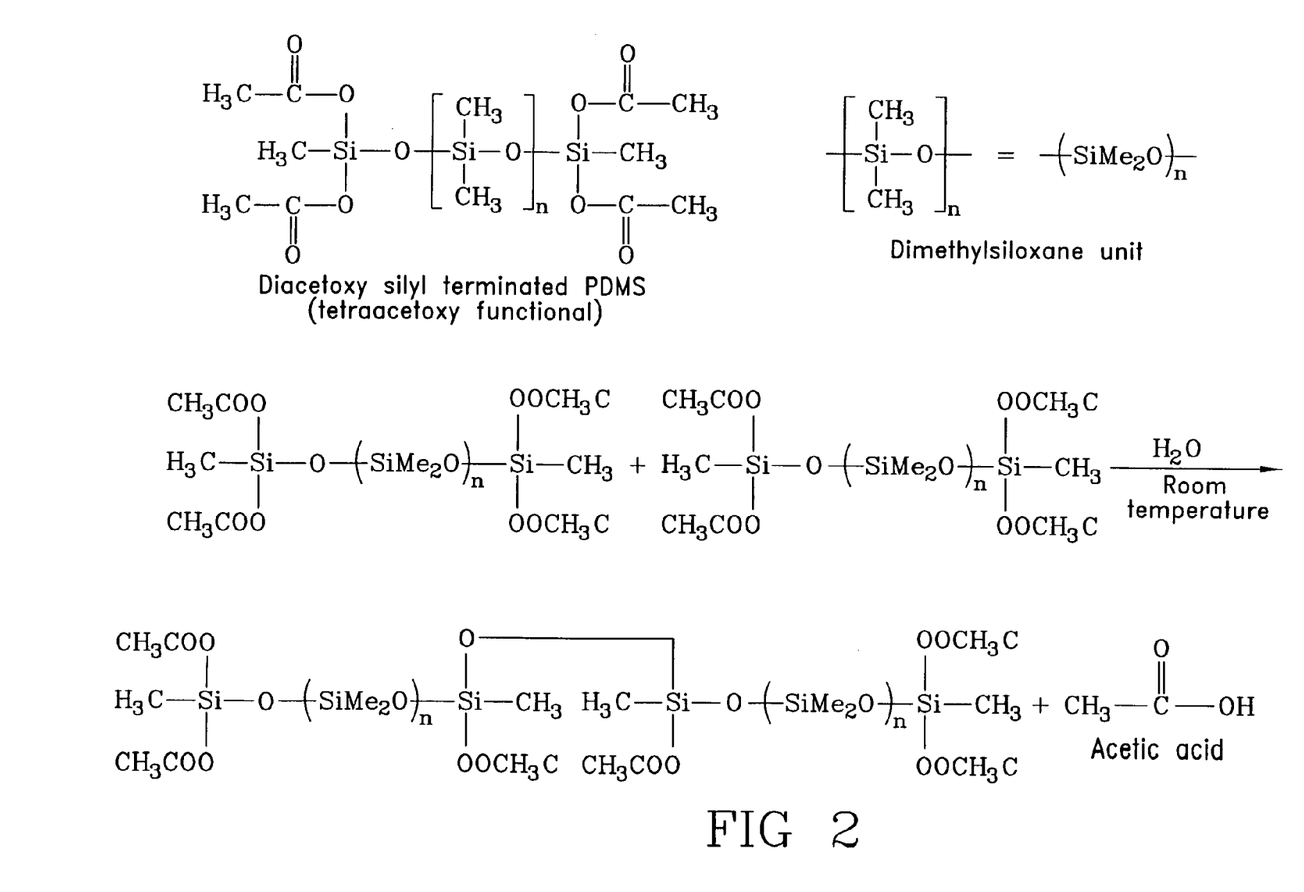
FIG. 2 shows the reticulation mechanism of tetraacetoxy-functionalized polydimethylsiloxane (see page 10, lines 9–10).
Figure 3:
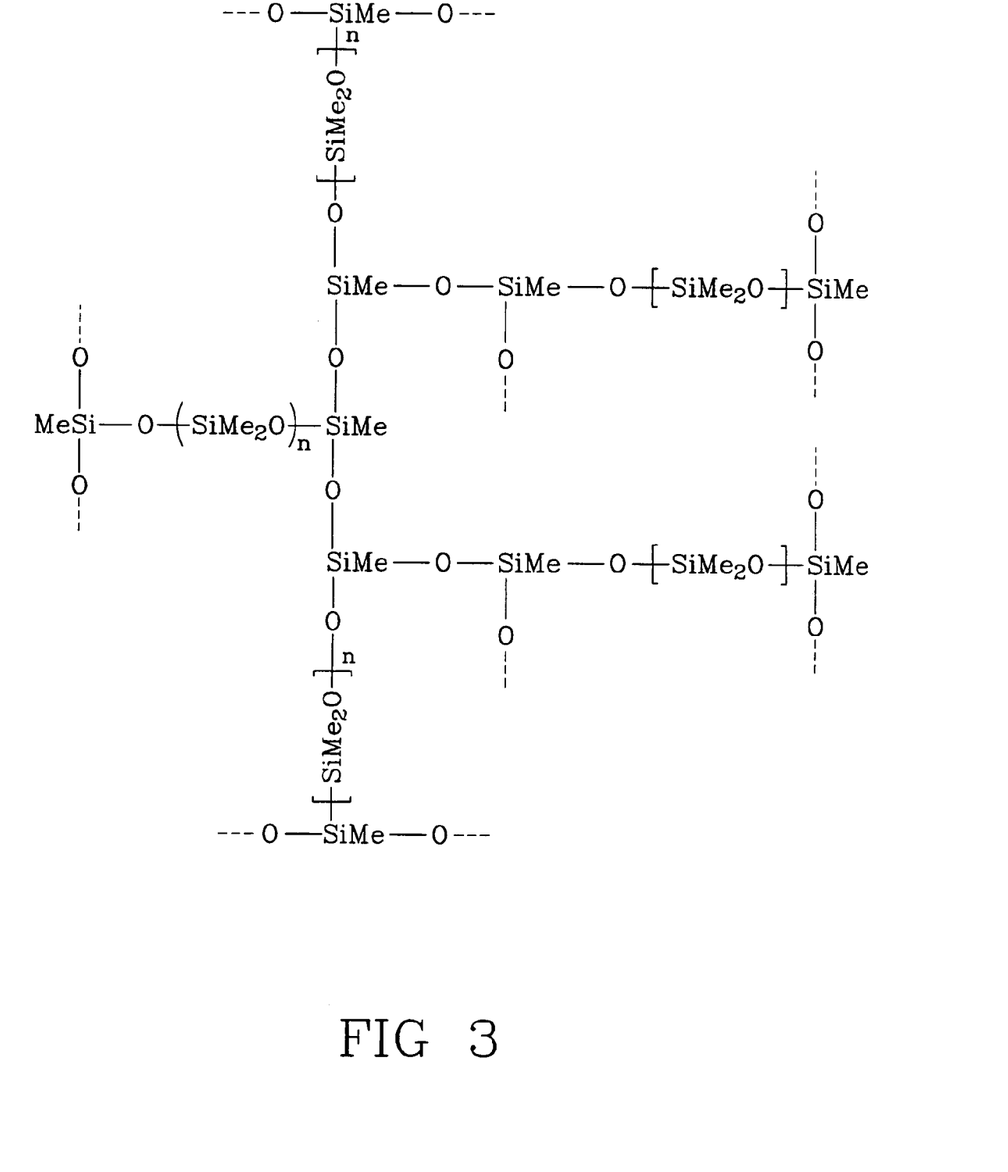
FIG. 3 shows the formation of a three-dimensional network (reticulation of chemical bonds) due to the presence of tetraacetoxy-functionalized polydimethylsiloxane (see page 10, lines 11–14).

The reaction byproduct is acetic acid obtained from the reaction mechanism and from the reticulation of polydimethylsiloxane as schematically shown in FIGS. 2 and 3.

FIG. 2 shows the reticulation mechanism of tetraacetoxy-functionalized polydimethylsiloxane.

FIG. 3 shows the formation of a three-dimensional network (reticulation of chemical bonds) due to the presence of tetraacetoxy-functionalized polydimethylsiloxane.

Then, once the synthesis is over, the elastomeric material prepared with the method described above is filtered so as to eliminate unreacted residues of said first and second component. The elastomeric material is kept at low temperatures until it is used for preparing film-like semi-finished products containing different percentages of silicone.

Characterization Tests

The elastomeric material according to the present invention prepared as described above has undergone a series of characterization tests.

A film sample has been characterized through microscope observations and through a heat analysis (DSC) (differential scanning calorimeter).

DSC analysis allows to measure glass transition temperature ($T_g$) crystallization temperature and melting point temperature.

These data are obtained subjecting the material to different heat cycles.

These characterization parameters of the material are necessary to identify the properties of the elastomeric material according to the present invention. According to its properties the elastomeric material is used for preparing valve substitutes and vascular ducts.

Figure 4:
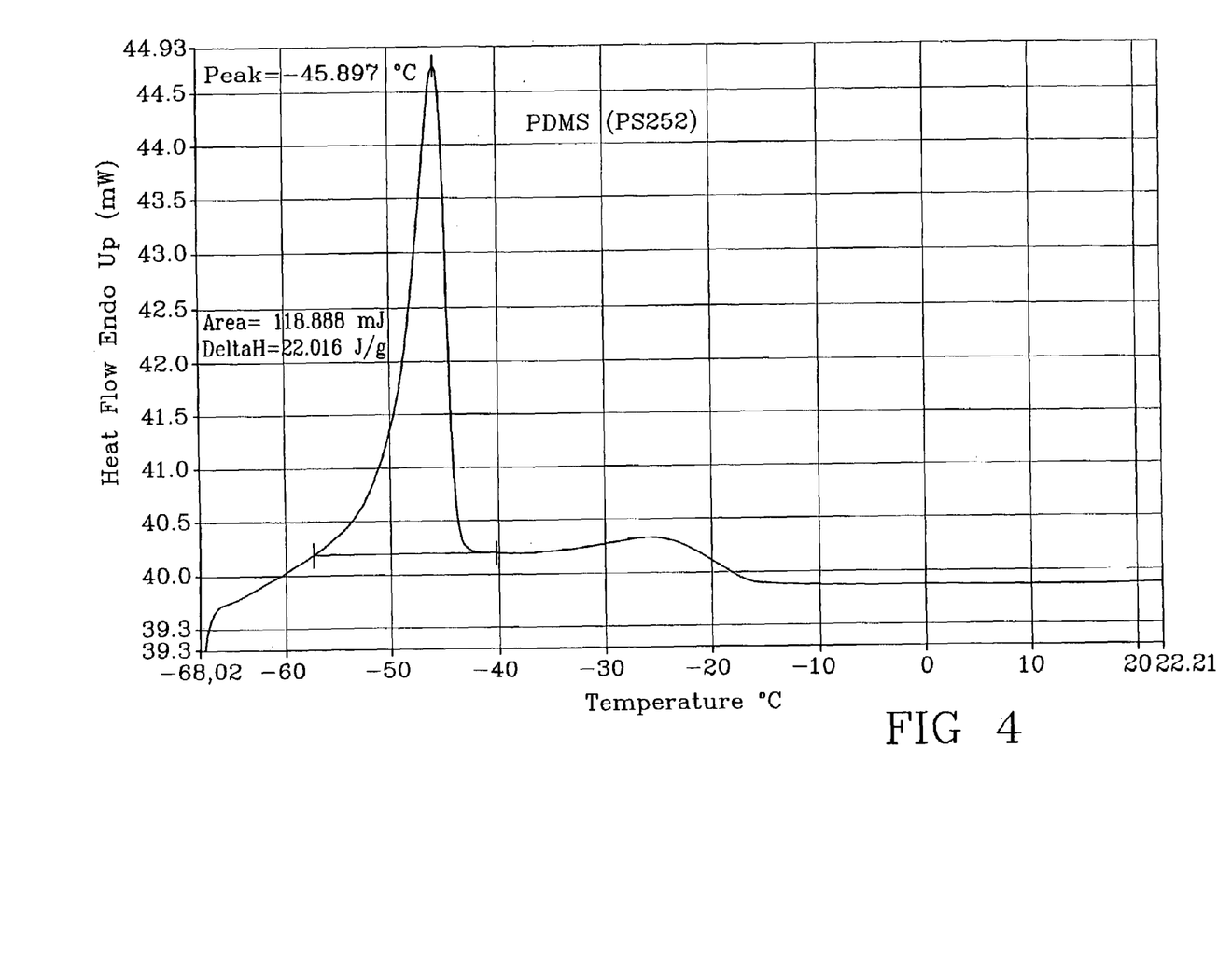
FIG. 4 shows the behavior of the material according to the present invention, containing 20% by weight of PDMS, compared with a known material such as Cardiothane®51 (commercial polyurethane) containing in (non-reticulated) mixture 10% by weight of chemically non-reticulated and releasable PDMS (see page 11, lines 10–15).

A DSC analysis of pure polydimethylsiloxane (PDMS) is shown by way of reference, see FIG. 4.

The characteristic peak of pure polydimethylsiloxane is shown in FIG. 4.

Figure 5:
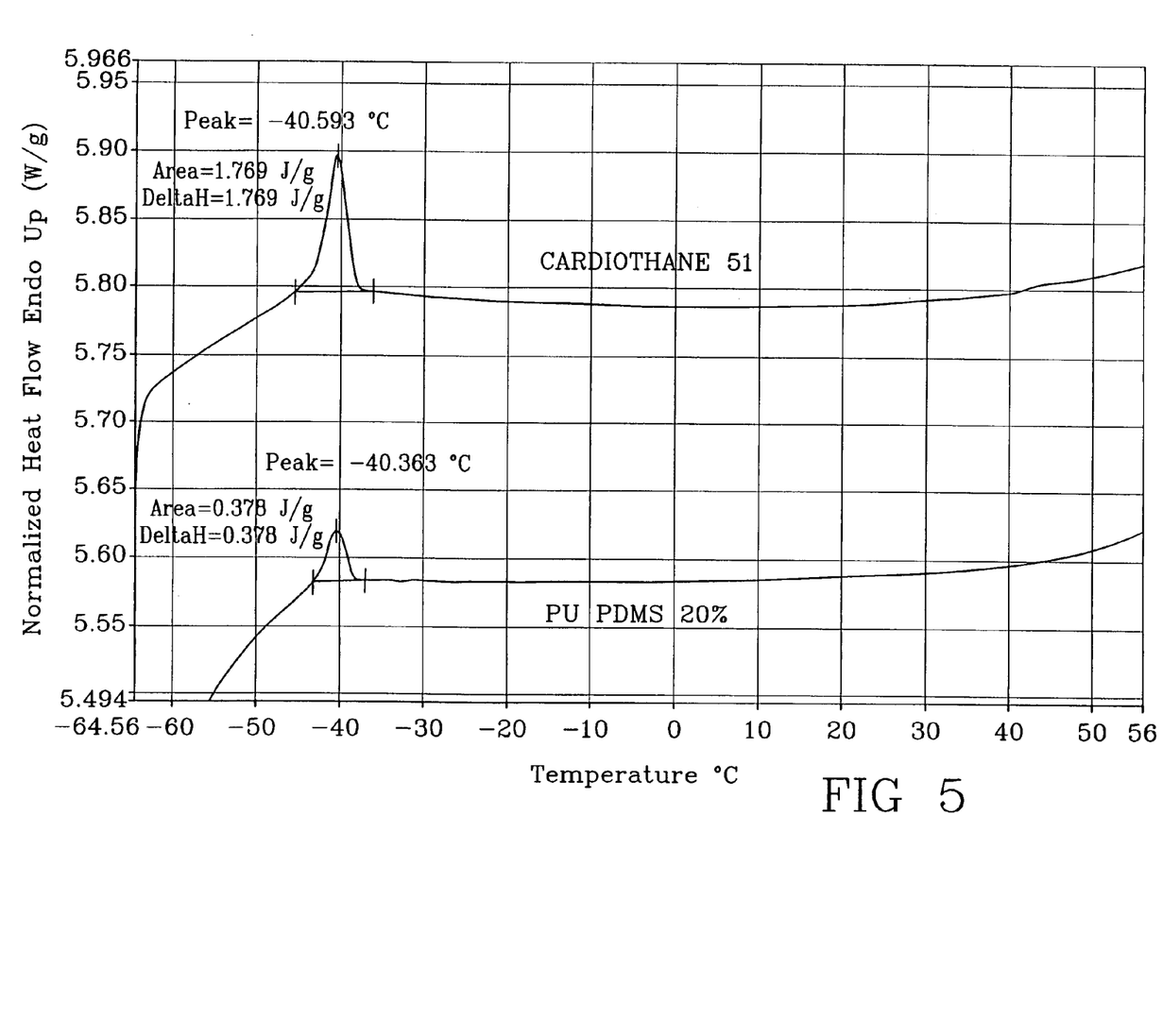
FIG. 5 shows a DSC spectrum of Cardiothane®51 and of the elastomeric material of the present invention obtained from aromatic polyurethane (PU) and 20% by weight of a functionalized polydimethylsiloxane (PDMS) (see page 11, lines 15–19).

FIG. 4 shows the behavior of the material according to the present invention, containing 20% by weight of PDMS, compared with a known material such as Cardiothane®51 (commercial polyurethane) containing in (non-reticulated) mixture 10% by weight of chemically non-reticulated and releasable PDMS. FIG. 5 shows a DSC spectrum of Cardiothane®51 and of the elastomeric material of the present invention obtained from aromatic polyurethane (PU) and 20% by weight of a functionalized polydimethylsiloxane (POMS).

Figure 6:
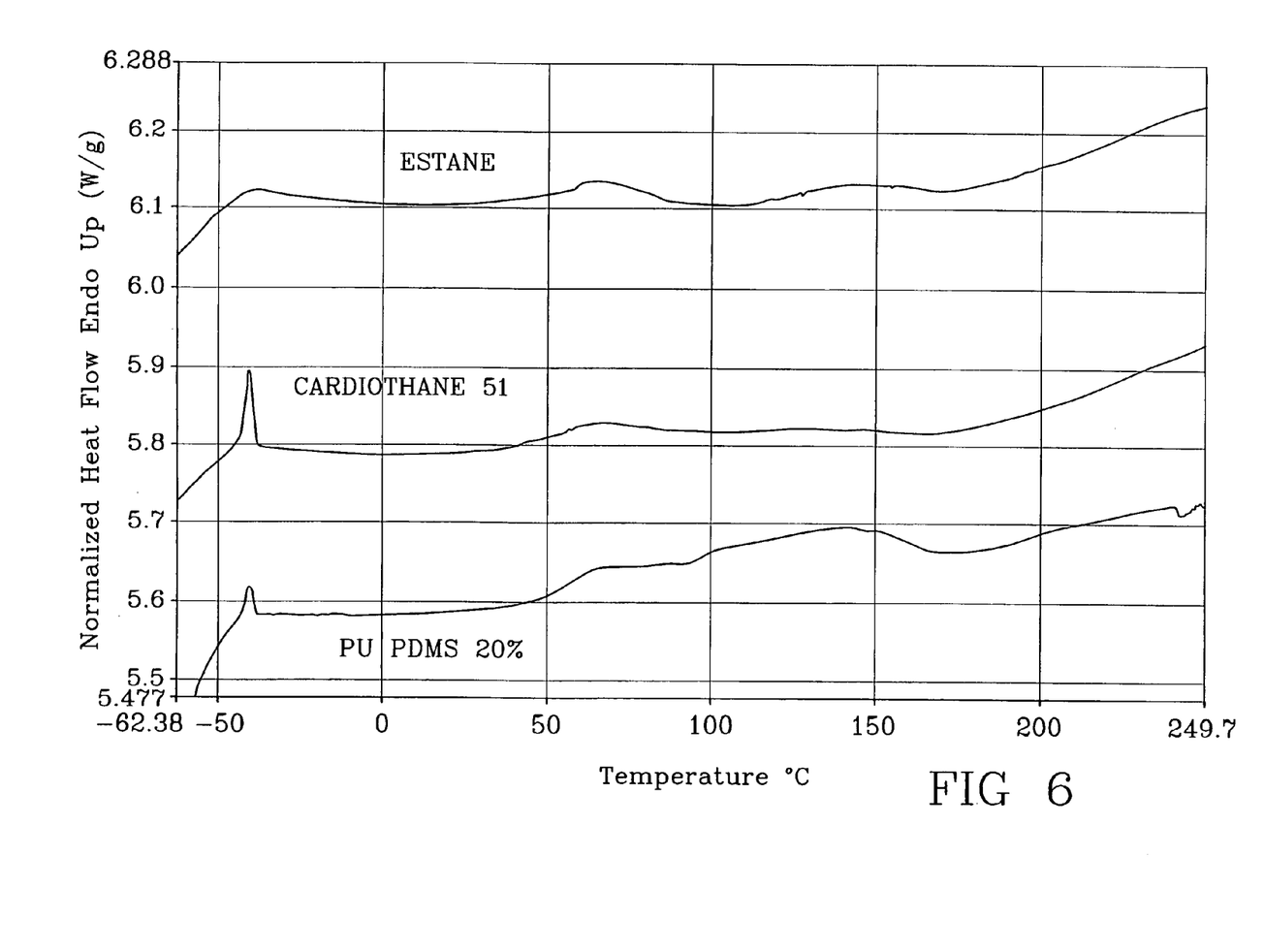
FIG. 6 is a comparative test between: a polyurethane (PU) named Estane, a material Cardiothane®51 (mixture of a polyurethane (PU) and a polydimethylsiloxane PDMS) and the elastomeric material according to the present invention, obtained from the synthesis of aromatic polyurethane and 20% by weight of functionalized polydimethylsiloxane (see page 11, lines 20–26).

FIG. 6 is a comparative test between: a polyurethane (PU) named Estane, a material Cardiothane® 51 (mixture of a polyurethane (PU) and a polydimethylsiloxane PDMS) and the elastomeric material according to the present invention, obtained from the synthesis of aromatic polyurethane and 20% by weight of functionalized polydimethylsiloxane.

An analysis of DSC curves in FIG. 6 points out the characteristic peaks of PDMS at a temperature of about −45° C., which are associated with the crystallization of the material.

The DSC graph of polyurethane (Estane), a material known to be an amorphous polymer, does not show any crystallization peak in the whole temperature range we have investigated (FIG. 6), Therefore, the area of the melting peak of PDMS represents a finger print for determining the amount of free (chemically non-bonded) polydimethylsiloxane that is present in the material according to the present invention.

As can be seen from FIG. 5, the peak of PDMS in Cardiothane® 51 (which contains less than 10% of non-bonded PDMS) is about three times greater than the peak obtained with the material according to the present invention, which contains 20% of chemically reticulated PDMS.

This means that in the material according to the present invention POMS is chemically bonded with polyurethane in a greater amount than POMS in Cardiothane®51. For this reason the amount of PDMS that can be crystallized in the invented material is smaller and the amount of PDMS that is free within the invented material is smaller.

The elastomeric material according to the present invention has also been evaluated and characterized through an ATR-FTIR infrared spectroscopy (Attenuated Total Reflectance Fourier Transform Infrared).

In practice, the material according to the present invention is irradiated with a IR beam at a given wave length of 4.000 to 650 cm⁻1. The radiation beam is reflected by a diamond crystal with a high refraction index.

A film of pure polyurethane (Estane), a reticulated film of tetraacetoxy-functionalized polydimethylsiloxane and a film of elastomeric material α-cording to the present invention, containing a concentration of PDMS of 10, 20, 40, 50, 60, 80 and 100%, have been analyzed. The above-mentioned films have been made using the "casting" technique, through which a thin film can be obtained starting from a diluted polymer solution.

At room temperature the solvent mixture used slowly evaporates because tetrahydrofurane and dioxane are highly volatile and, therefore, the polymer can be deposited as a homogenous thin film, which is reticulated through atmospheric humidity.

PDMS concentration in the elastomeric material represents a critical value for giving the final material given characteristics and properties.

Indeed, two different situations and behaviors of the material can be observed.

Figure 7:
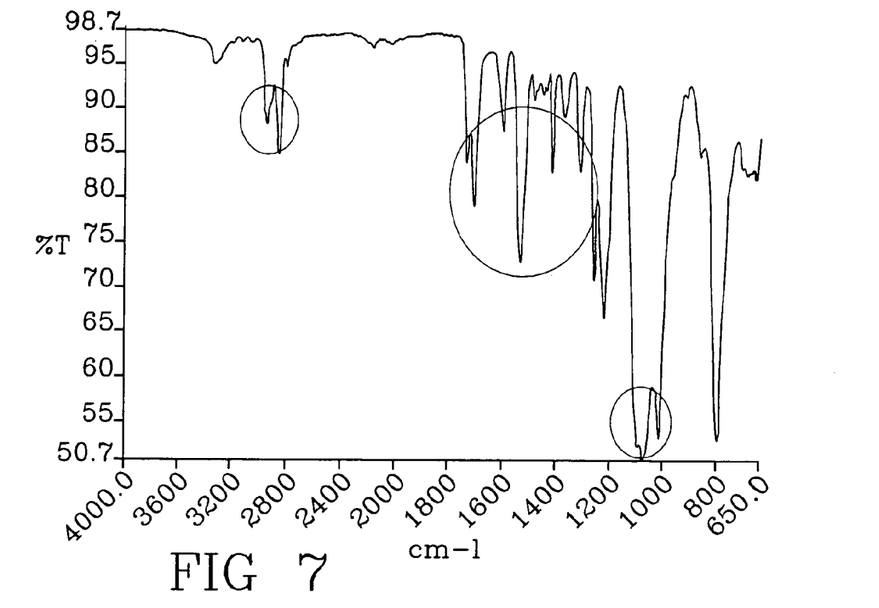
FIG. 7 shows an IR spectrum of a material.

In a first case the elastomeric material containing 10 to 40% by weight of PDMS has an IR spectrum (FIG. 7) with the characteristic peaks of polyurethane groups that are present on the material surface.

Figure 8:
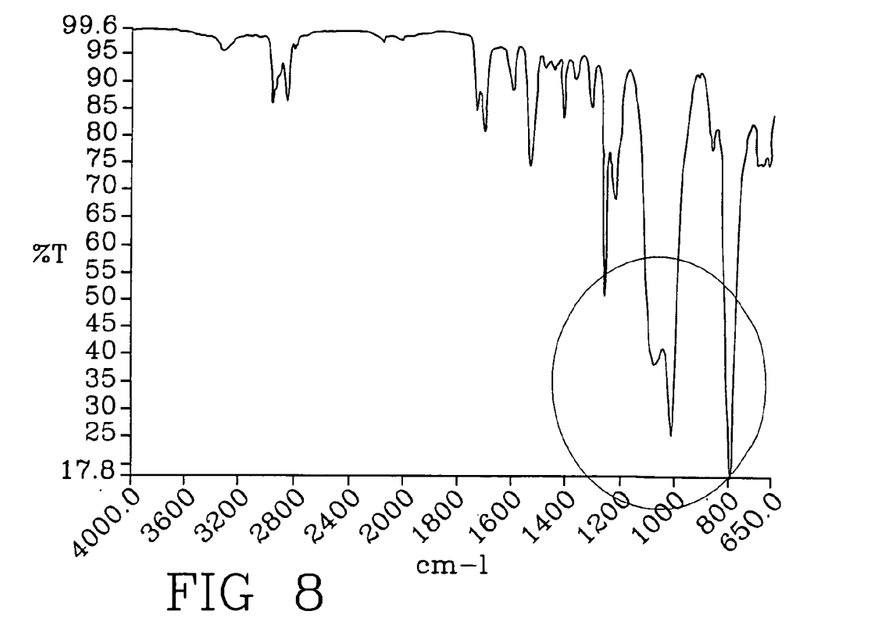
FIG. 8 shows an IR spectrum of another material.

In a second case the elastomeric material containing 60 to 90% by weight of PDMS has an IR spectrum (FIG. 8) with the characteristic peaks of PDMS groups that are present in the elastomeric material.

These preliminary studies show that in the elastomeric material according to the present invention the amount of unreacted (free) silicone is minimum, because most of said silicone is chemically bonded with polyurethane chains and is reticulated with the other PDMS molecules, thus forming a PDMS network interpenetrating with reticulated polyurethane. From a theoretical point of view said reticulated polymer can be imagined as a linear molecule containing macrocycles having various sizes on its chains.

This particular three-dimensional structure gives the elastomeric material according to the present invention properties of biocompatibility, biostability, hemocompatibility and mechanical properties that are higher than the analogous commercial material.

Analyses have shown that the critical concentration is of 30 to 40% by weight of PDMS. PDMS makes the surface of the elastomeric material able to behave as an actual silicone surface, and makes it therefore useful for specifically manufacturing or building devices coated with the elastomeric material according to the present invention and having surface properties of excellent blood contact, or small-diameter vascular grafts that will be developed with this material.

The composition is obtained through a synthesis process resulting in an interpenetrating polymeric network.

The particular structure (an interpenetrating polymeric network) combines the excellent chemical-physical properties of polyurethane with the properties of biostability and hemocompatibility of silicone.

Another object of the present invention consists in the use of said material for making vascular ducts with microdiameters and for coating intravascular metal stents and vascular prostheses.

Small-diameter vascular ducts, cardiovascular patches, valve sheets and sheets for valve prostheses can be prepared with the elastomeric material as such.

Alternatively, abdominal nets can be coated preferably with polypropylene (so as to avoid intestinal adhesion) or prostheses can be coated with polyester.

Valve prostheses as such, coatings of intravascular metal stents and vascular prostheses in DACRON® have been evaluated from the functional point of view though both in vitro and in vivo tests.

The composition according to the present invention has been characterized from the physical point of view through mechanical stretch and circumferential dilatation tests. These tests have shown that the presence in the elastomeric material of a given amount of functionalized PDMS, 30 to 40% by weight, for instance 40% by weight, gives the material isotropic properties.

As far as biocompatibility is concerned, various tests have been carried out in order to evaluate the characteristics of toxicity, biostability and hemocompatibility.

The composition has been tested through in vitro citotoxicity tests by putting different cell types in contact with extracts of the material.

Three commercial polymers, whose lack of citotoxicity is known, have been chosen as reference material to compare the citotoxicity of the elastomeric material of the present invention with increasing percentages of silicone PDMS (10, 30, 40 and 100%). The tests have been carried out according to ISO norms (10993-5, Tests for citotoxicity: in vitro method).

At the end of the period of cells contact with the extracts, the presence or absence of the citotoxic effect has been qualitatively evaluated through MTT test, neutral red test and bromine deoxyuridine (BrdU) incorporation test.

The results of in vitro citotoxicity tests obtained with the elastomeric material according to the present invention are compared with those of the polymers used as reference, and indicate that the new material is not toxic.

The lack of toxicity is further confirmed by in vivo tests carried out in the intramuscular system (rabbit's paraventral muscle) and involving the incorporation of material strips for one week (ISO 10993-6, Tests for local effects after implantation).

The potential inflammatory reaction caused by the implantation made with the material according to the present invention, containing various percentages of silicone PDMS, has been evaluated through tests involving the incorporation of material strips into rabbit's paravertebral muscle for periods varying from 8 to 12 months.

The histological (hematoxylin-eosin) and immunohistochemical (through monoclonal antibodies directed against inflammatory cells, in particular macrophages) analysis of tissue surrounding the implantation site have pointed out the absence of inflammatory reactions for the material according to the present invention with silicone percentages of 20, 30 and 40%, whereas both lower and higher percentages have resulted in quite a remarkable reaction.

Biostability has been evaluated through the implantation of strips of the material, both as such and after 100% stretch, into rat's dorsal-lumbar region. The samples explanted and analyzed through SEM and FT-IR have shown an absence of biodegradation for silicone contents of 30 and 40% with respect to higher and lower percentages. Vascular prostheses carried out with the composition according to the present invention have been tested for hemocompatibility through in vitro tests involving human blood circulation and implantation of sheep's carotid artery by-pass. In vitro tests with the elastomeric material containing different percentages of silicone take into consideration some parameters concerning adhesion and platelet activation. The results have identified the elastomeric material containing 30 to 40% of silicone as the least thrombogenic. This elastomeric material has been chosen for the subsequent in vivo implantations.

Until today excellent results have been achieved with vascular prostheses that are still pervious after ten and twelve months from the implantation.

Furthermore, an endothelialization of the material has been observed in some explanted prostheses already twenty days after the implantation.

This is a distinguishing trait not found with other marketed materials.

As far as the preparation of endovascular metal stents is concerned, a full coating with a thickness of 6 microns has been made with the material according to the present invention, which coating fully covers the filaments both inside and outside.

Said coating has been observed through SEM using both morphologic analysis and microanalysis.

Given the good hemocompatibility results obtained with the prostheses, the material according to the present invention, a condensate of 30 to 40% by weight of silicone, has been chosen for coating the stents, which have been implanted through angioplastic surgery into sheep's femoral artery for one week.

When explanted the stents have proved to be without thrombotic formations, thus keeping the blood vessel completely pervious.

In the elastomeric material according to the present invention silicone PDMS is between 20 and 40% by weight.

A concentration of polydimethylsiloxane of 20 to 40% by weight ensures a low cell damage, a low inflammatory reaction and a higher stability. On the other hand, too high a concentration of polydimethylsiloxane, for instance above 60% by weight, causes a cell damage.

In practice, the investigations carried out on the elastomeric material according to the present invention have shown that silicone PDMS has such a protective effect towards polyurethane that it protects the latter from biodegradation.

What is claimed is:

1. A process for preparing an elastomeric material comprising a step in which a polyether-urethane is reacted with a polydimethylsiloxane in presence of a solvent at a temperature below 100° C., wherein said polydimethylsiloxane is present at a concentration from 20 to 60% by weight and said polydimethylsiloxane has four terminal acetoxy groups, two for each terminal chain portion.

2. The process according to claim 1, wherein said reaction is carried out in oxygen free atmosphere.

3. The process according to claim 2, wherein said reaction is carried out in nitrogen ambient to avoid moisture.

4. The process according to claim 1, wherein said reaction is carried out for a period of 1 to 12 hours.

5. An elastomeric material obtained from a process according to claim 1.

6. A process for preparing an elastomeric vascular device or an elastomeric valve device comprising the step of producing said device with the elastomeric material as claimed in claim 5.

7. The process according to claim 6 wherein the device is a vascular duct or a cardio-vascular patch.

8. The process according to claim 6 wherein the device is a valve prosthesis or a sheet for a valve prosthesis.

9. A process for coating a stent or a vascular prosthesis or an abdominal net comprising the step of coating said stent, prosthesis or net with the elastomeric material as claimed in claim 5.

10. The process according to claim 9 wherein said stent is a metal stent.

11. The process according to claim 9 wherein said vascular prosthesis is made of polyester.

12. The process according to claim 9 wherein said abdominal net is made of polypropylene.

13. The process according to claim 4, wherein said reaction is carried out for a period of 4 to 6 hours.

14. The process according to claim 1, wherein the solvent is a mixture of tetrahydrofurane and dioxane.

15. The process according to claim 1, in which said temperature is from 78 to 88° C.

16. The process according to claim 1, in which said temperature is from 80 to 84° C.

17. The process according to claim 1, wherein the concentration is from 20 to 40% by weight.

18. The process according to claim 1, wherein the concentration is from 30 to 40% by weight.

19. The process according to claim 1, wherein said polydimethylsiloxane is chosen among polydimethylsiloxanes having a viscosity of 300 to 400 cps; a molecular weight of 5000 to 50000 Dalton; reticulation time of 4 to 8 hours (based on pure compound); an elongation greater than 150 (based on pure compound) and a Shore A hardness greater than 8.

20. The process according to claim 1, wherein said polyether-urethane is chosen among polyether-urethanes having a viscosity of 600 to 900 cps, a molecular weight of 10000 to 200000 Dalton and a Shore A hardness greater than 80.

* * * * *

UNITED STATES PATENT AND TRADEMARK OFFICE
CERTIFICATE OF CORRECTION

| | | |
|---|---|---|
| PATENT NO. | : 7,157,118 B2 | Page 1 of 1 |
| APPLICATION NO. | : 10/677389 | |
| DATED | : January 2, 2007 | |
| INVENTOR(S) | : Giorgio Soldani | |

It is certified that error appears in the above-identified patent and that said Letters Patent is hereby corrected as shown below:

On the cover page, under (30) Foreign Application Priority Data
  please delete "April 10, 2002", and insert therefor
         --October 4, 2002--.

Signed and Sealed this

Twenty-eighth Day of August, 2007

JON W. DUDAS
*Director of the United States Patent and Trademark Office*